United States Patent
Chang et al.

(10) Patent No.: US 6,840,968 B2
(45) Date of Patent: Jan. 11, 2005

(54) METHOD FOR PURIFICATION THROUGH SUBLIMATION

(75) Inventors: Shu-Wen Chang, Nantou (TW); Gwo-Sen Lin, Taichung (TW); Chi-Min Chen, Taichung (TW)

(73) Assignee: Wintek Corporation, Taichung (TW)

( * ) Notice: Subject to any disclaimer, the term of this patent is extended or adjusted under 35 U.S.C. 154(b) by 52 days.

(21) Appl. No.: 10/424,123

(22) Filed: Apr. 28, 2003

(65) Prior Publication Data

US 2004/0211038 A1 Oct. 28, 2004

(51) Int. Cl.$^7$ ................................................. B01D 9/00
(52) U.S. Cl. .................................................. 23/294 R
(58) Field of Search ........................... 23/294 R, 293 A

(56) References Cited

U.S. PATENT DOCUMENTS 4,654,048 A * 3/1987 Braun et al. ............... 23/293 A
5,173,088 A * 12/1992 Maeda et al. ............. 23/295 R \* cited by examiner

*Primary Examiner*—Stanley S. Silverman
*Assistant Examiner*—Edward M. Johnson
(74) *Attorney, Agent, or Firm*—Birch, Stewart, Kolasch & Birch, LLP

(57) ABSTRACT

A method for purification through sublimation includes a step of compressing a powdered object to be purified in a tight and compact manner such as granules or cakes under a preset pressure, temperature and time for containing a greater amount of substances in a unit volume so that the object to be purified has an improved heat transfer efficiency and heating power is more stable. During sublimation process a flowing inertia gas is channeled to carry the sublimated and purified substances so that the purified substance flow in the same direction for depositing.

10 Claims, 2 Drawing Sheets

METHOD FOR PURIFICATION THROUGH SUBLIMATION

FIELD OF THE INVENTION

The present invention relates to a method for purification through sublimation to improve purifying process of powdered objects.

BACKGROUND OF THE INVENTION

Purification through sublimation is an integrated technique that mainly uses thermal energy to transform a mixed compound into two phases, including separated gas and liquid states, and gas and solid states. The technique may be adopted in processes for mixed compound systems consisting of proximate or common boiling points. Through the common boiling points the compounds are distilled by sublimating or extracted by distilling and sublimating to achieve purification and refinement.

The present methods for purification through sublimation generally use a sublimation apparatus to hold a powdered object to be sublimated and heat in a vacuum environment to sublimate the object to achieve the purpose of purification. As the object to be sublimated is formed in powders, it has a loose structure with a lot of voids formed in the object. The voids result in poor heat transfer effect. The effect is especially obvious in the vacuum environment.

Because of the loose structure of the structure of the object to be purified, the substance in a unit volume is limited. As a result, the resulting purified material after each sublimation process is small. To obtain a selected amount of purified material, many times of sublimation and purification processes have to be performed. During sublimation and purification processes; the door of the purification chamber has to be opened whenever the object of the purification is replaced. Every time the door of the purification chamber is opened, temperature must be lowered and gas has to be discharged. Once the object of the purification has been replaced, another gas discharge and heating have to be performed. The processes waste time and increase the possibility of lower quality of purification.

Moreover, the general methods for purification through sublimation have the purified material flowing in any direction after the sublimation was finished. They result in the purified material depositing in a scattered manner in every collecting section. Collecting the purified material also is time consuming.

SUMMARY OF THE INVENTION

Therefore the primary object of the invention is to resolve the aforesaid disadvantages. The invention compresses a powdered object to be purified in a tight and compact form under a preset pressure, temperature and time. As the powder object to be purified is formed in a tight and compact manner, more substances are contained in a unit volume, thus more purified material may be collected in each sublimation and purification process. As a result, operation time may be saved and the possibility of producing sub-quality purified material is reduced.

In addition, as the object to be purified is compressed in a tight and compact manner, there are no voids formed in the object. Thus the poor heat transfer problem no longer exists and heat transfer speed between the objects to be purified increases. Energy may be saved in the heating process. Moreover, a flowing inert gas is used to carry the object to be purified to deposit in a constant direction and replace the original air. The pressure during the sublimation and purification processes may be maintained at 0.1 torr. A high degree of vacuumized environment is not necessary. Thus purification process time is reduced and pressure control during the sublimation and purification processes also is easier.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
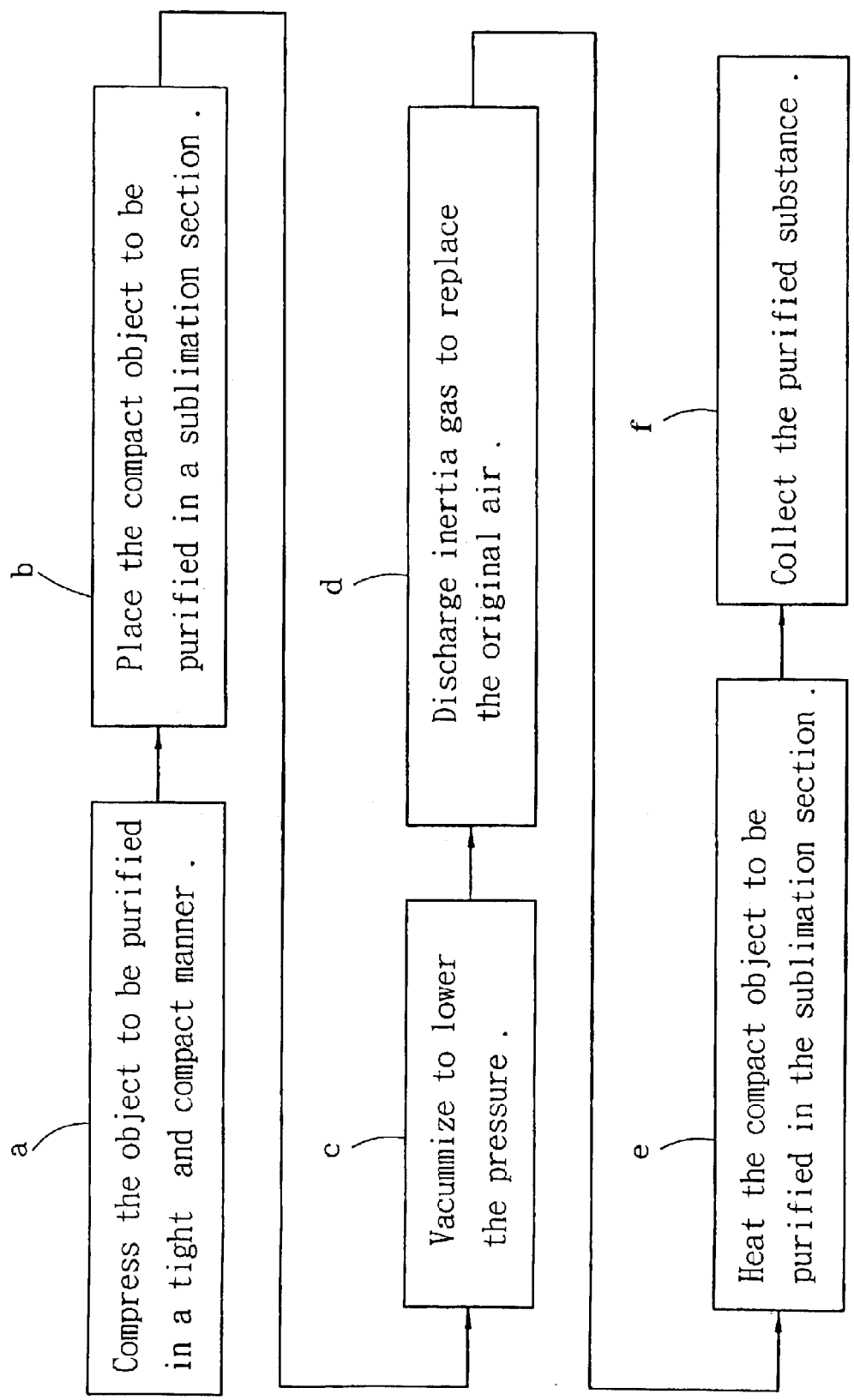
FIG. 1 is a process block diagram of the method for purification through sublimation according to the invention.
Figure 2:
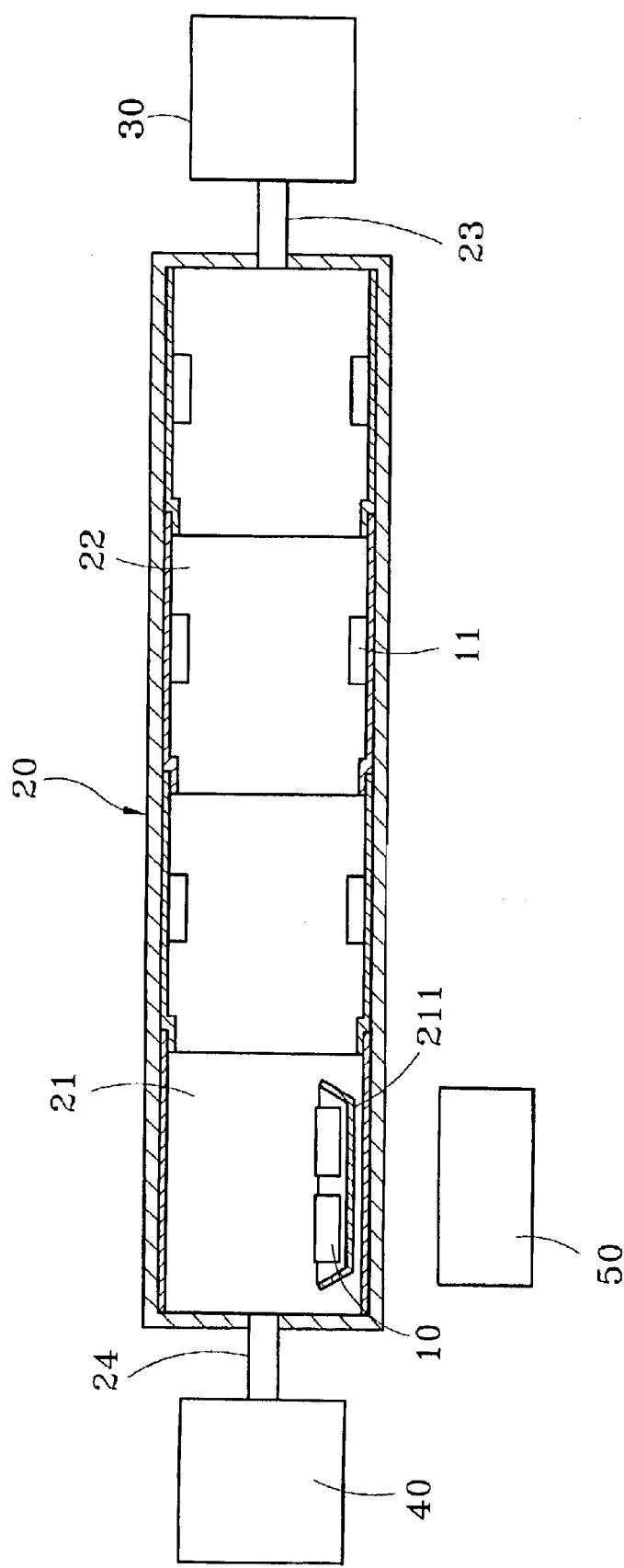
FIG. 2 is a schematic view of the method for purification through sublimation according to the invention.

Refer to FIG. 1 for the process of the method for purification through sublimation according to the invention. The powdered object to be purified 10 is compressed to form a tight and compact manner under a preset pressure, temperature and time. Thus more substances of the object to be purified 10 are contained in a unit volume. Therefore the carrying device 211 of the sublimation section 21 can hold more objects to be purified 10 in each sublimating process. Moreover, as the object to be purified 10 is compressed in a tight and compact form, there is no void the object. Thus heat transfer efficiency increases and heating power is more stable. Furthermore, a flowing inertia gas is used as the carrier gas during collecting the sublimated and purified substance 11, the purified substance 11 may be gathered and collected in a more concentrated manner. The method for purification through sublimation according to the invention includes the following steps:

a. Compress the powdered object to be purified 10 in a tight and compact manner under a preset pressure, temperature and time. The preset pressure ranges from 5000 lb/in$^2$ to 50000 lb/in$^2$. The temperature ranges from 20° C. to 120° C., and the time ranges from 20 minutes to 60 minutes. The pressure, temperature and time conditions may be adjusted according to the crystalline form and compact degree of the object to be purified 10 and under the condition of not affecting the property of the object to be purified 10. The tight and compact form may be granules or cakes.

b. Referring to FIG. 2, after the object to be purified 10 has been compressed in a compact form in step a, it is placed in a sublimation section 21 located at one end of a purification apparatus 20. The sublimation section 21 has a carrying device 211 for holding the object to be purified 10. The purification apparatus 20 further has two or more collecting sections 22 connecting to the sublimation section 21.

c. A vacuum system 30 is connected to another end of the purification apparatus 20 through a gas discharge outlet 23. The vacuum system 30 discharges air through the gas discharge outlet 23 to lower gas pressure until the interior of the purification apparatus 20 reaching the pressure of 0.1 torr (one atmosphere is 760 torr).

d. An inertia gas apparatus 40 is connected to the sublimation section 21 of the purification apparatus 20 through a gas inlet 24 for discharging an inert gas into the purification apparatus 20 at a preset rate, and the vacuum system 30 also discharges air through the gas discharge outlet 23 at a preset rate. While the vacuum system 30 discharges the air, the inert gas is stopped from being discharged into the purification apparatus 20. And while the inertia gas is discharged into the purification apparatus 20, the vacuum system 30 stops discharging the air out. The operation set forth above repeats a number of times to allow the inertia gas to replace the air in the purification apparatus 20 until the interior pressure of the purification apparatus 20 reaching the pressure of 0.1 torr.

e. A heater 50 is disposed on the location outside the purification apparatus 20 corresponding to the sublimation section 21 for heating the object to be purified 10. The heating temperature of the heater 50 ranges from 200° C. to 500° C. depends on the property of the object to be purified 10. While the heater 50 heats the object to be purified 10 to sublimate, the inertia gas also is discharged concurrently into the purification apparatus 20 through the gas inlet 24 and out through the gas discharge outlet 23 to allow the inertia gas flowing in the purification apparatus 20 at a selected speed so that the sublimated and purified substance 11 also is flown to the collecting sections 22 with the inert gas. The sublimated and purified substance 11 deposits on the inner walls of the collecting sections 22 because the temperature in the collecting sections 22 is lower than the sublimation section 21.

f. After the purification process is finished, the purified substance 11 is deposited on the inner walls of the collecting sections 22. Then the purified substance 11 may be removed from the collecting sections 22.

The purified substance 11 may be made from an organic or inorganic material. The inertia gas may be nitrogen, argon or helium gas.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for purification through sublimation by compressing a powdered object of purification to a tight and compact manner for containing a greater amount of substances evenly in a unit volume so that the object of purification has an improved heat transfer efficiency, the method comprising steps of:

a. compressing powders of the object to be purified in a tight and compact manner under a preset pressure, temperature and time;

b. placing the compressed object to be purified on a carrying device located in a sublimation section of a purification apparatus;

c. discharging an inertia gas from an inertia gas apparatus into the purification apparatus through a gas inlet and discharging air from the purification apparatus through a gas discharge outlet so that the inertia gas replaces the air originally contained in the purification apparatus;

d. vacuumizing the purification apparatus by a vacuum system through the gas discharge outlet to lower the pressure of the interior of the purification apparatus to 0.1 torr;

e. heating the sublimation section of the purification apparatus through a heater located outside the purification apparatus corresponding to the sublimation section to sublimate the object to be purified; and f. collecting purified substances deposited on collecting sections of the purification apparatus.

2. The method of claim 1, wherein the object to be purified is an organic or an inorganic material.

3. The method of claim 1, wherein the preset pressure ranges from 5000 $lb/in^2$ to 50000 $lb/in^2$ and is adjustable according to the compact degree of the object to be purified without affecting the property of the object to be purified.

4. The method of claim 1, wherein the preset temperature ranges from 20° C. to 120° C. and is adjustable according to the compact degree of the object to be purified without affecting the property of the object to be purified.

5. The method of claim 1, wherein the preset time ranges from 20 minutes to 60 minutes and is adjustable according to the compact degree of the object to be purified without affecting the property of the object to be purified.

6. The method of claim 1, wherein the tight and compact manner is formed in granules or cakes.

7. The method of claim 1, wherein the gas discharge outlet is located on another end of the sublimation section of the purification apparatus, and the gas inlet is located on one end thereof opposite to the gas discharge outlet.

8. The method of claim 1, wherein the inertia gas is nitrogen, argon or helium gas.

9. The method of claim 1, wherein the temperature of the sublimation section heated by the heater ranges from 200° C. to 500° C.

10. The method of claim 1, wherein the inertia gas enters into the purification apparatus through the gas inlet and is discharged through the gas discharge outlet while the object to be purified sublimates.

* * * * *